(12) United States Patent
Singnurkar

(10) Patent No.: US 8,421,526 B2
(45) Date of Patent: Apr. 16, 2013

(54) CIRCUIT CHARGE PUMP ARRANGEMENT AND METHOD FOR PROVIDING A REGULATED CURRENT

(75) Inventor: Pramod Singnurkar, Graz (AT)

(73) Assignee: austriamicrosystems AG, Unterpremstaetten (AT)

( * ) Notice: Subject to any disclaimer, the term of this patent is extended or adjusted under 35 U.S.C. 154(b) by 0 days.

(21) Appl. No.: 13/201,404

(22) PCT Filed: Feb. 8, 2010

(86) PCT No.: PCT/EP2010/051516
§ 371 (c)(1),
(2), (4) Date: Oct. 24, 2011

(87) PCT Pub. No.: WO2010/092026
PCT Pub. Date: Aug. 19, 2010

(65) Prior Publication Data
US 2012/0105138 A1    May 3, 2012

(30) Foreign Application Priority Data

Feb. 12, 2009  (EP) .................................. 09001978

(51) Int. Cl.
*G05F 1/10* (2006.01)

(52) U.S. Cl.
USPC ....................................................... 327/543

(58) Field of Classification Search ........................ None
See application file for complete search history.

(56) References Cited

U.S. PATENT DOCUMENTS

| 5,929,617 | A | 7/1999 | Brokaw |
| 6,031,362 | A | 2/2000 | Bradley |
| 2002/0171481 | A1* | 11/2002 | Sasho et al. ................... 330/129 |
| 2004/0208011 | A1 | 10/2004 | Horiuchi et al. |
| 2005/0047181 | A1 | 3/2005 | Yamamoto et al. |
| 2005/0104542 | A1 | 5/2005 | Ito et al. |
| 2006/0114721 | A1* | 6/2006 | Frulio et al. ............. 365/185.18 |
| 2008/0239801 | A1 | 10/2008 | Thorp et al. |

FOREIGN PATENT DOCUMENTS

| DE | 100 13 216 | 9/2001 |
| EP | 1 185 147 | 3/2001 |
| EP | 2 197 244 | 12/2008 |
| GB | 2 398 682 | 8/2004 |

\* cited by examiner

*Primary Examiner* — Lincoln Donovan
*Assistant Examiner* — Sibin Chen
(74) *Attorney, Agent, or Firm* — Cozen O'Connor

(57) ABSTRACT

A power source arrangement comprises a controlled and clocked operated power source, that power source providing an output voltage out of a plurality of output voltages in response to a first multiplication factor. One or more regulated current sources are connected to the controlled and clocked operated power source to provide an output current to respective loads. Each of the one or more regulated current sources is adapted to provide a first indication signal upon a regulated operation of the respective current source. The power source arrangement further comprises a dummy power source as well as a dummy current source connected to the dummy power source. The dummy current source receives a load signal corresponding to a voltage drop over the loads connected to the one or more regulated current sources and provides a second indication signal in response thereto. A control circuit receives the respective first and second indication signal and provides the control signal to the controlled and clocked operated power source in response thereto.

15 Claims, 9 Drawing Sheets

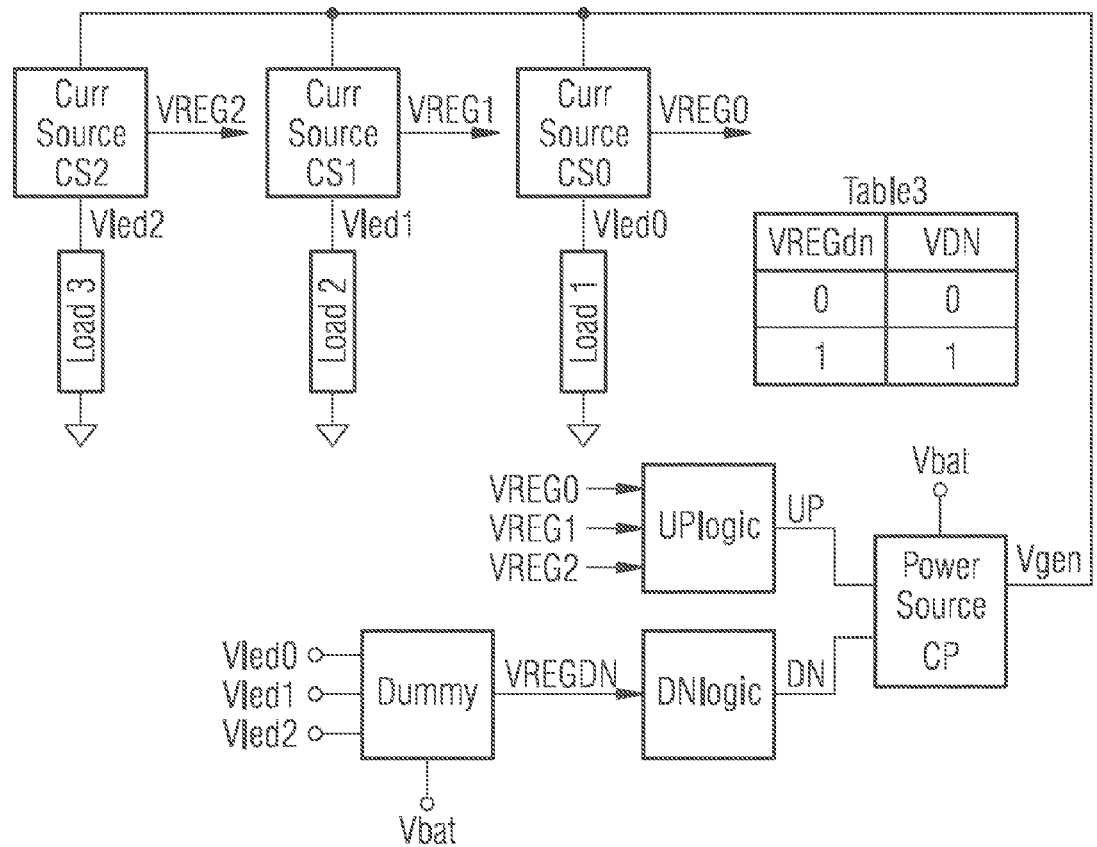

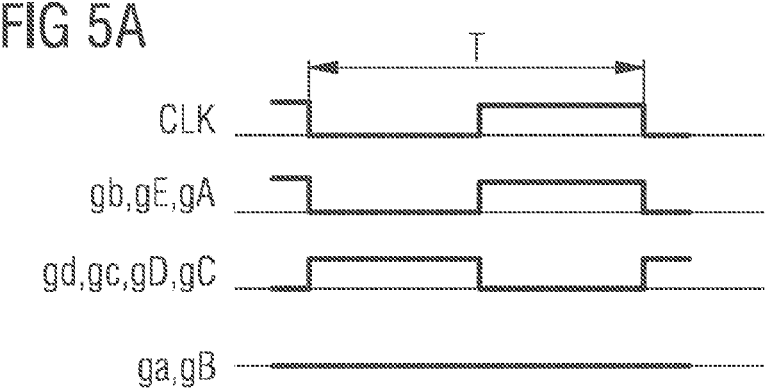
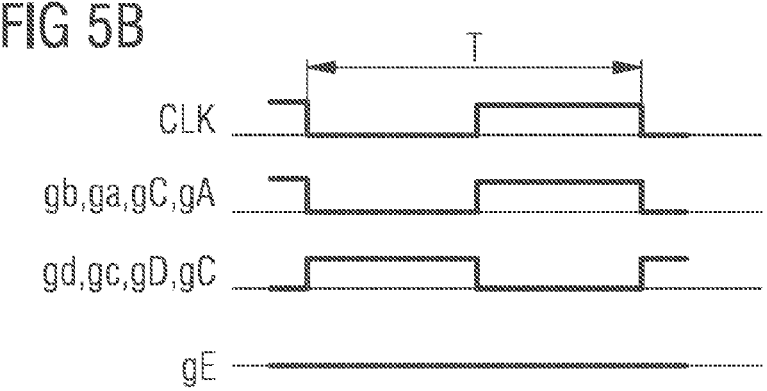
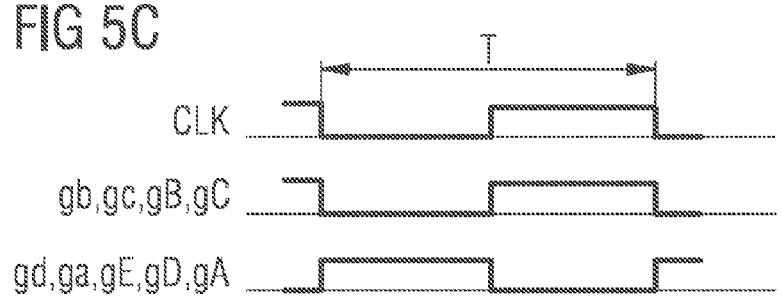

Finding higher voltage of two voltages

Symbol

Finding higher voltage of multiple voltages

CIRCUIT CHARGE PUMP ARRANGEMENT AND METHOD FOR PROVIDING A REGULATED CURRENT

RELATED APPLICATIONS

This is a U.S. National Phase Application under 35 USC 371 of International Application PCT/EP210/051516 filed on Feb. 8, 2010.

This Application Claims the Priority of European Application No. 09001978.7 filed Feb. 12, 2009, the entire content of which is hereby incorporated by reference.

FIELD OF THE INVENTION

The present invention is related to a circuit charge pump arrangement and to a method for providing a regulated current to a load.

BACKGROUND OF THE INVENTION

Current sources are commonly used for several applications to provide voltage or current signals to one or more different loads. Often, such loads require voltages or currents, which are different from a voltage or current supplied by an externally arranged supply source. Such supply sources may include batteries, for example. It is therefore a common practice to power a current source with a power source to convert the voltage provided by the externally arranged supply source to the required voltage for the load. For instance, mobile applications, including transmitters, receivers and the like, may require voltages and current signals different from the voltage and current signal provided by a battery. Accordingly, current sources with DC/DC converters or charge pump are used to provide the respective signals to the load. Further, current sources are often used for driving light emitting diodes.

In addition, different loads may require different voltages or currents for its respective operation. Still, the current sources providing the respective signals to the load connected thereto are in turn coupled to a common charge pump or DC/DC converter. The current sources now comprise an adjustment device which receives a supply voltage and provides respective voltage and current signals to the load. The adjustment device often comprises an adjustable resistive element for the purpose of providing current to a load connected thereto. The voltage applied to the current source is therefore divided between the load and the adjustment device of the respective current source itself. The loss of power across the current source may now increase with higher voltage drops across the adjustment device, which therefore reduces the overall efficiency.

On the other hand, power sources, like for instance a charge pump may be operated on different discrete output voltage levels. A multiplication factor can be assigned to each output voltage, wherein the output voltage is given by the multiplication factor times the supply signal applied to the power source.

FIG. 13 shows the architecture of a prior art digital power source. A charge pump may provide an output voltage Vgen to a current source connected thereto in response to a respective multiplication factor, said factor derived by a signal provided by the current source.

If the factor is equal or lower than "1", the charge pump generates an output voltage Vgen lower than the supply voltage VBAT. Accordingly, the charge pump may generate higher output voltages Vgen than the supply voltage VBAT if the multiplication factor is greater than 1. Typical charge pumps can operate on some different multiplication factors. In dependence on the load connected to the current source, it may become necessary to increase or decrease the multiplication factor in the set of available values of the multiplication factor to provide sufficient current and voltage to the load.

SUMMARY OF THE INVENTION

One object of the present invention is to provide a new architecture for a circuit charge pump arrangement, which reduces the loss of power, therefore increasing the overall efficiency, and also allows an improved accuracy of finding the necessary multiplication factor.

An embodiment of the invention is related to architecture that provides a minimum voltage drop across the current source by generating only the minimum voltage required to drive the current source and particularly the adjustment device of the current source. The respective multiplication factor is found and adjusted automatically taking temperature and process-dependent effects into account. In addition, multiple current sources can be used in such arrangement using a single power source, as, for example, a DC/DC converter or charge pump. With respect to the known arrangement of FIG. 14 (explained below), in which the decision whether to increase or decrease the multiplication factor of the charge pump by the respective up and down signals, is made using a plurality of comparators, the proposed architecture reduces the overall number of comparators.

In an embodiment of the present invention, a circuit pump arrangement comprises a controlled power source. The controlled power source provides an output voltage out of a plurality of different discrete output voltages in response to a control signal. The controlled power source may therefore provide an output voltage out of a plurality of digitally selectable output voltages.

A first multiplication factor can be assigned to the control signal, so that the output voltage provided by the power source is substantially given by a reference voltage, e.g. an externally applied supply voltage applied to the power source times the first multiplication factor. Accordingly, the first multiplication factor can be derived by a respective control signal applied to a controlled power source.

One or more regulated current sources are connected to the controlled power source to provide an output current to respective one or loads connected thereto. Each of the one or more regulated current sources are adapted to provide a first indication signal, the indication signal indicating a regulated operation of the respective one or more regulated current source. In other words the first indication signal indicates, whether the respective current source operates in regulated mode or not. In this respect "regulated" operation means that the current source provides sufficient enough current or voltage to the load.

The circuit arrangement comprises a dummy power source and a dummy current source connected to the dummy power source. The dummy current source is adapted to receive a load signal corresponding to the highest voltage drop over the loads connected to the one or more regulated current sources and/or the highest current drawn by the load. In response thereto, the dummy current source provides a second indication signal.

Finally, a control circuit is adapted to receive the respective first indication signal and the second indication signal and provides the control signal in response thereto.

The circuit arrangement according to the proposed embodiments may adjust the multiplication factor in response to an indication signal provided by the current sources connected to the power source. If the output voltage of the power source of the circuit arrangement is sufficient to operate the respective current source in regulated mode, the charge pump does not increase the multiplication factor to increase, in turn, the output voltage. On the other hand, the dummy power source and the dummy current source connected thereto determine whether the circuit arrangement is operated in a mode providing a lower output voltage. For that purpose, the dummy current source receives a load signal and provides an indication signal and response thereto.

In an embodiment, the dummy current source may determine whether the dummy current source can be driven in the regulated mode or not while it receives the load signal.

In response to the first and second indication signal, the current source may increase or decrease the multiplication factor. Particularly, if any of the one or more regulated current sources indicate by issuing a respective first indication signal that it is not in regulated mode, the control circuit may increase the multiplication factor causing the controlled power source to provide a higher output voltage. If on the other hand the dummy current source provides the second indication signal, indicating that it operates regulated or is in regulated operation mode, the control circuit may output a control signal to cause the controlled power source to reduce the output voltage to the next lower level.

In an embodiment, the dummy power source is adapted to provide a plurality of output voltages in response to a second multiplication factor. The second multiplication factor may be derived from the first multiplication factor. In an embodiment, the second multiplication factor comprises a lower value than the first multiplication factor. As a result, the dummy power source provides a lower output voltage to the dummy current source. If now the dummy current source indicates by the second indication signal that it is operated in regulated mode, the control circuit may in turn provide the control signal to reduce the multiplication factor of the controlled power source. In summary, the controlled power source is operated using control signals to provide different discrete output voltages to the one or more regulated current sources sufficiently high to operate the one or more regulated current sources in regulated operation and supply the respective modes with the required currents or voltage signals.

In another embodiment, the dummy current source comprises a regulating element to provide an output voltage to the dummy current source, which is lower than the output voltage provided by the controlled power source. Such regulating element can be, for instance, a variable resistor. Alternately, a hysteresis effect can be introduced using an extra voltage drop from the output of the dummy current source. It is possible to increase or decrease the resistance value of a resistor, depending, for instance, upon the highest possible voltage distortion on an external supply voltage applied to the controlled power source and to the dummy power source.

In an embodiment, the one or more regulated current sources and/or the dummy current source comprise a terminal, which is adapted to receive a sensing voltage, that sensing voltage provided by the load or the load signal. The one or more regulated current source and/or the dummy current source further comprises a first loop having a first sensing path with a sensing transistor and a second loop with a second sensing path and a sensing transistor. The second loop may also comprise the controlled power source in case of the one or more regulated current sources or the dummy power source in case of the dummy current source. The first and the second sensing paths are coupled to the output terminal of the respective charge pump. In addition, the first loop is adapted to provide a control signal to the sensing transistor of the second sensing path, wherein the second sensing path is coupled to the first sensing path and adapted to restrict the sensing transistor of the second sensing path to operate in a linear region of its characteristics.

The one or more regulated current sources may also comprise a controllable output device connected to the terminal to provide the output current to a respective load connected thereto. The controllable output device also receives the control signal provided by the first loop and is coupled to the output terminal of the controlled power source.

In another embodiment, the second sensing path provides a sensing current dependent on a current derives by the difference of the source-drain voltages of the sensing transistors of the first and the second sensing path in operation.

In another embodiment, the first sensing path and the second sensing path each comprise a second transistor, whose respective gates are coupled via a voltage source.

The one or more regulated current sources as well as the dummy current source may comprise a similar structure but may differ in the sizes of the sensing transistors of their respective sensing paths. Still, an output current of the second sensing path of the one or more regulated current sources and/or the dummy current source may be dependent on a difference of a steady state current through the first sensing transistor and a current given by the voltage source arranged between the second sensing transistors.

The gate-source voltages of the sensing transistors of the first sensing path and the sensing transistor of the second sensing path may be substantially equal.

The one or more regulated current sources and/or the dummy current source may also comprise a third loop having a comparator coupled to the first sensing path and the terminal to receive the load signal or the sensing voltage provided by the load connected to the respective regulated current source. The comparator provides a comparison signal to the gate of the second transistor and the first sensing path.

The one or more regulated current sources and the respective controlled power source can comprise the same or similar structure as the dummy power source and the dummy current source. Some elements of the power sources as well as of the current sources, particularly the sensing transistors of the one or more regulated current sources and the dummy current source may comprise a predetermined and fixed size ratio.

In another embodiment of the proposed circuit arrangement, a comparison unit may be provided for generating the load signal applied to the dummy current source in response to one or more signals. Each of the one or more signals corresponds to the voltage drop over one of the respective loads connected to the one or more regulated current sources. Alternately, one or more signals correspond to a current drawn by the load or a voltage across the load. The load signal may correspond to the highest voltage drop over the respective loads connected to the one or more regulated current sources.

BRIEF DESCRIPTION OF THE DRAWINGS

FIG. 1 shows a schematic view of a circuit charge pump arrangement according to an embodiment of the present invention, FIG. 2 shows a table indicating the result of the control signal in response to the first indication signals, FIG. 5A illustrates a time diagram for signals applied to the respective switches of a charge pump in a 1:1 output mode, FIG. 5B shows the time diagram of the signals applied to the switches in a 1:1.5 mode, FIG. 5C shows the signals applied to the switches in a 1:2 mode of the charge pump according to the embodiment of FIG. 4.

DETAILED DESCRIPTION OF THE DRAWINGS

Figure 3:
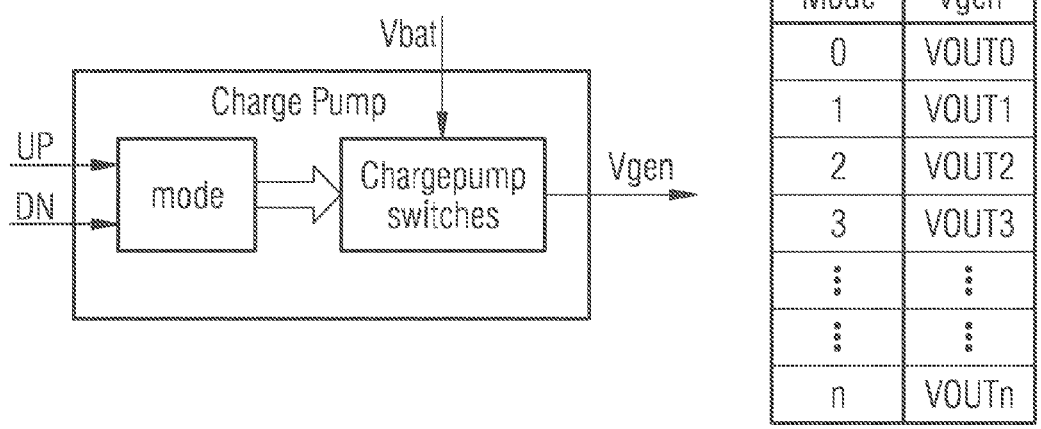
FIG. 3 shows a schematic view of a charge pump including the control circuit to change the multiplication factor using different adjustments of the charge pump switches.

In the following detailed description, several aspects of the present invention are explained in greater detail with reference to the accompanying drawings. However, those features shown in the figures are not restricted to the respective embodiments, but can be combined in different ways by a person skilled in the art. The switches for the current source according to the present invention are illustrated by simple field-effect transistors for illustration purposes. However, those switches are not restricted to field-effect transistors but can be implemented in different ways, including transmission gates, transistors of any kind and/or other devices for this purpose. The power source may include the controlled and clocked charge pump as indicated in the following embodiments, but is not restricted thereto. Also, DC/DC converters or other digitally controllable power sources capable of providing different output voltages can be implemented in the circuit arrangement according to the present invention.

Some sub-circuits or elements are represented enlarged with respect to other element. Such enlargement is for illustration purposes and does not reflect differences in real size when implementing those elements. The transistors and elements used in the power source and the regulated current source can be scaled down by a specific factor with respect to the dummy power source and to the dummy charge pump. Particularly, the dummy devices as well as the "real" devices in the circuit arrangement according to the present invention may comprise a similar or even same structure in various elements with difference only that the various elements of the dummy devices are scaled down with respect to the same elements found in the real devices.

The circuits and sub-circuits shown herein can be implemented in a single semiconductor body as integrated circuit or as separated circuits using integrated as well as discrete components and devices. Further, EP application 08021645.0, filed on Dec. 12, 2008 by the same applicant and having the same inventor and its content is incorporated herein in its entirety. Particularly, reference is made to the various embodiments of current sources described in the figures and description of the mentioned application.

FIG. 1 shows a circuit arrangement having three regulated current sources (CurrSource) CS0 to CS2, each of them connected with its respective output terminal to a load Load 1 to Load3. Each of these loads draws current from the respective current sources, consequently resulting in a voltage drop indicated as Vled0 to Vled2. Each of the current sources is supplied by a controlled power source CP. The power source in the embodiments is implemented as a controlled and clocked charge pump, which in turn is supplied by an external power source Vbat. In any case the controlled power source can be implemented by various circuits, being capable of providing different output voltages. Current sources CS0 to CS2 also provide indication signals VREG0 to VREG2, indicating a regulated operation mode of the respective current source. For this purpose, the current source determines, whether the provided current is sufficient to supply the load connected thereto.

If the current source is capable of providing enough current to the load, while being supplied by a signal from the power supply, the current source regulates the output to the load and issues a respective signal VREG. If the supply signal from the power source is too low, the current source fails to achieve regulation. As a result, an indication signal will be issued indicating an unregulated state of the respective current source. The term "regulation mode" and the different operation modes of the current sources are explained in greater detail later on with respect to FIG. 6.

Voltage Vgen generated by charge pump CP is dependent on respective control signals provided by logic signals UP and DN. As explained later, a multiplication factor can be assigned to the control signals, wherein the multiplication factor determines output voltage Vgen by: Vgen=multiplication factor times external power supply voltage Vbat.

The control signals UP, DN are generated in turn by a respective control logic blocks UPlogic and DNlogic. The logic block UPlogic receives indication signals VREG0 to VREG2 provided by the respective current sources CS0, CS1 and CS2. The current source is considered to operate in regulated mode if the supply voltage Vgen provided by the respective charge pump is sufficiently high to drive the power transistors within the current source to provide sufficiently enough current to the load connected to the respective current source. If the output voltage Vgen of the power source CP is not high enough, at least one of the current sources is unregulated indicated by its indicating signal VREG, having a low level.

Accordingly, the control logic block UPlogic receives the low level of the respective indication signal and generates a control signal to increase the output of the power source. As a result, power source CP generates a higher output voltage Vgen to supply the respective current sources. An internal multiplication factor of the power source is increased by the respective control signal of control logic UPlogic in response to the indication signals VREG0 to VREG2 as long as one of the current sources indicates an unregulated mode.

FIG. 2 shows a combination table of the indication signals VREG0 to VREG2 and the resulting control signal UP of the control circuit. As previously explained, as long as one of the regulation signals VREG0 to VREG2 is at low level, thereby indicating an unregulated mode of the respective current source, control logic UPlogic provides high level for control signal UP causing power source CP to increase the multiplication factor, thereby providing higher output voltages. As soon as all regulation signals have a high level indicating a regulated operation mode for each of the current sources, control signal UP is changed to low level.

On the other hand, the control circuit also receives another indication signal VREGDN indicating that the current sources may also operate with a lower supply voltage Vgen. Accordingly, the control logic provides a control signal to power source CP causing the power source to lower its internally derived multiplication factor, thereby decreasing the output voltage Vgen. The generation of the second indication signal VREGDN will be explained later on in greater detail with respect to FIGS. 9, 10, 11, and 12.

FIG. 3 shows a schematic view of the controlled and clocked charge pump according to the present invention.

As previously mentioned, the control circuit provides two signals UP and DN indicating to increase or decrease the multiplication factor, thereby generating higher or lower output voltages. For this purpose, control signals UP and DN are received by a mode circuit within the controlled power source. The mode circuit "mode" selects the respective switching signals and provides switching signals to charge pump switches as indicated. Depending on the switching signals, the charge pump can be operated in different modes. The table in FIG. 3 shows generated output voltage Vgen in different modes starting with mode 0 having the lowest output voltage VOUT0 to mode n with the highest output voltage VOUTn.

If the multiplication factor is equal or smaller than 1, the charge pump provides an output voltage, which is also equal or smaller than the externally applied supply voltage Vbat. With several charge pump switching states corresponding to multiplication factors greater than 1, the charge pump provides an output voltage Vgen greater than the externally applied supply voltage Vbat.

Figure 4:
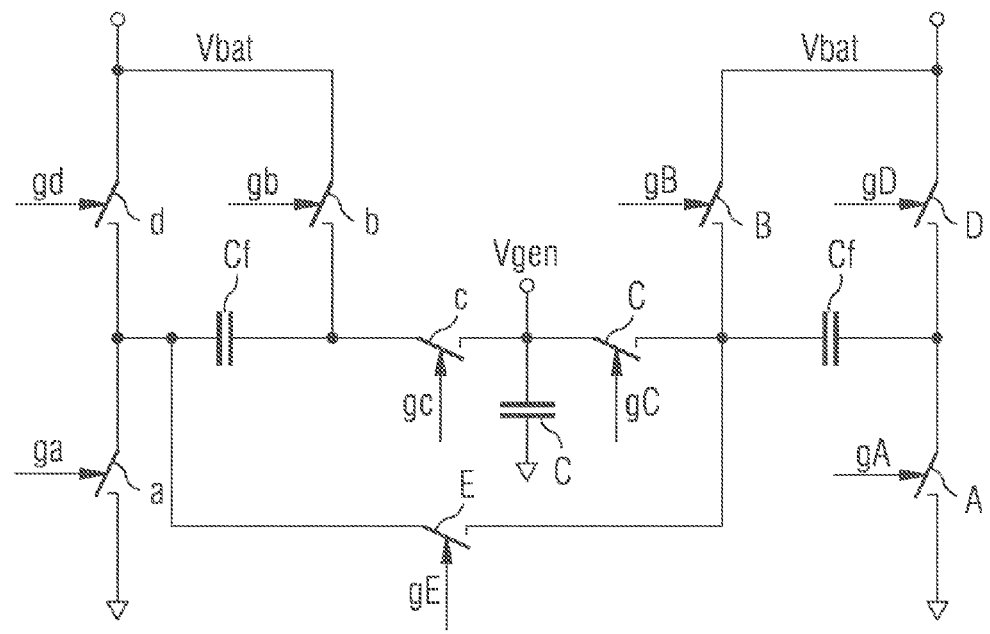
FIG. 4 illustrates an embodiment of a charge pump which can be operated with different voltage output modes.

FIG. 4 shows a typical charge pump switch and capacitor arrangement, the arrangement being capable of generating different output voltages. The output voltage Vgen provided at the respective terminal can be equal to the externally applied voltage Vbat or greater than the externally applied voltage depending on the charge pump switches a to d and A to D. These switches can be implemented using transistors, field-effect transistors, transmission gates and the like. The charge pump shown in FIG. 4 can be operated in a 1:1 mode, in a 1:1.5 mode and in a 1:2 mode.

During the 1:1 mode, the output voltage Vgen is substantially equal to the externally applied voltage Vbat. Accordingly, in the 1:1.5 operation, the maximum output voltage is substantially 1.5 times higher than the externally applied voltage, in the 1:2 mode, the output voltage Vgen is substantially twice the externally applied supply voltage Vbat. The clocked operated charge pump of FIG. 4 comprises a first and the second switch b, d connected to a supply terminal for receiving the supply voltage Vbat and two respective terminals of a first charging transistor Cf. Further, switch d is connected via switch a to ground terminal.

A second pair of switches B, D is connected with first terminals to the supply terminal for the supply voltage Vbat and with the respective second terminals to a second charging transistor Cf. Switch D is also coupled to ground terminal via switch A.

The second terminal of switch B is coupled via switch E to the second terminal of switch d. Finally, two switches c and C are coupled with first terminals to switches b and B, respectively, and with their second terminals to the output terminal for providing the output voltage Vgen. The output terminal is also connected with a capacitor C.

In operation of the controlled and clocked charge pump, mode circuit MODE according to FIG. 3 provides charge pump switch signals ga to gd and gA to gD to the respective switches. For this purpose, mode circuit MODE receives clock signal CLK having a clock period. The switches of the charge pump are now closed and opened in response to the clock signal, thereby either charging the charging capacitors Cf to a predetermined voltage and then providing the charge on the charging capacitors to the output terminal of the charge pump.

FIG. 5A shows the signals during a clock period of clock signal CLK for the charge pump being operated in a 1:1.5 mode.

During this mode, signals ga and gB are always at low level, thereby keeping switches a and B open during the clock period. Switches d, c as well as D and C are closed by the respective signals gd, gc, gD, gC during the first half of the clock period CLK and opened during the second half. Accordingly, switches b, E, A are opened during the first half of the period of clock signal CLK and closed during the second half. As a result, both charging capacitors Cf as well as capacitor C is charged during the first half of the clock cycle. During the second half, the charge stored in capacitor C is provided at the output terminal to generate the output voltage Vgen.

FIG. 5B shows the respective switching signals ga to gd and gA to gE for the 1:2 mode, thereby generating an output voltage Vgen two times the externally applied voltage Vbat. During a period of clock signal CLK, switch E remains open. In the first half of the clock period, switches d, c and D, C are closed, thereby charging the capacitors Cf. Switches b, a, C and A remain open. During the second half of the clock period, these switches become closed, switches d, c, D and C are opened. As a result, the charge of charging capacitors Cf is provided to the output terminal.

The switching signals for the switches during a clock period to operate the charge pump in a 1:1 mode are illustrated in FIG. 5C. During this operation, switches d, a, E, D and A are closed during the first half of the clock period while switches b, c, B and C are opened.

Figure 6:
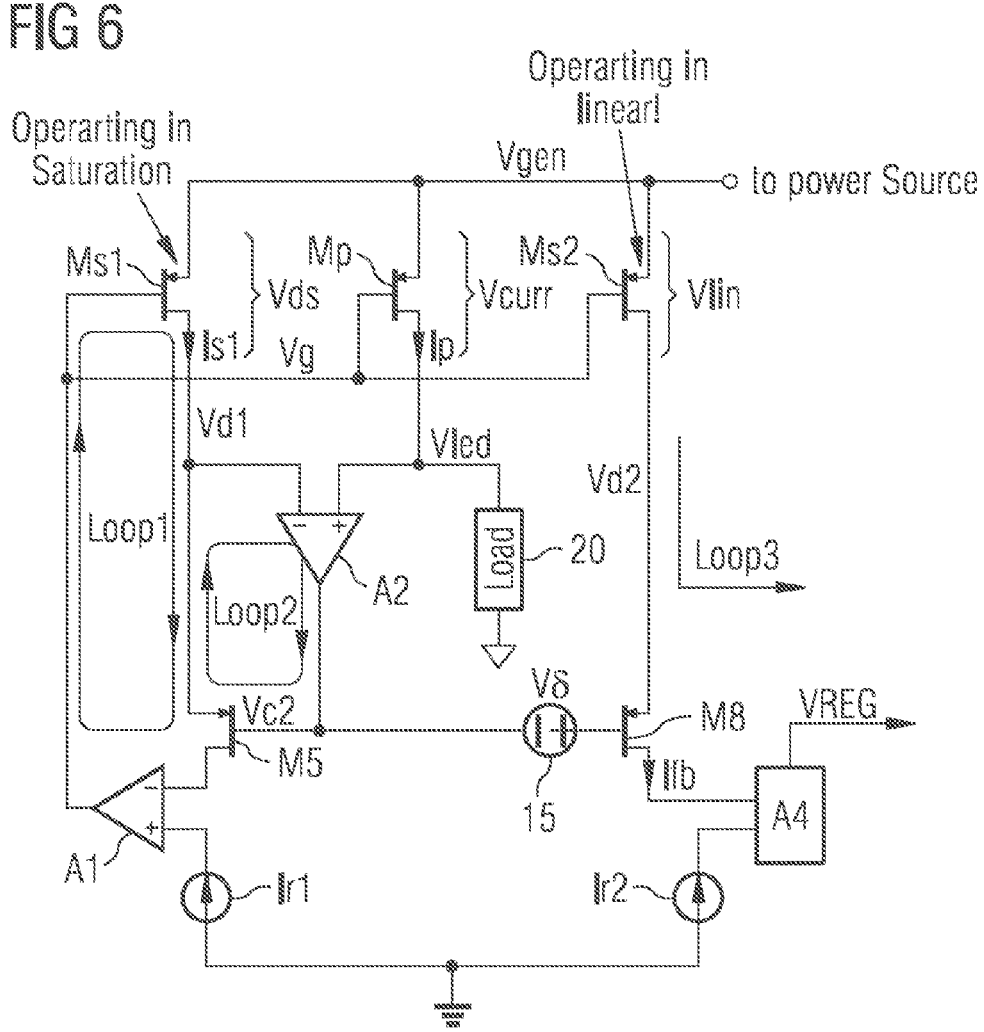
FIG. 6 shows an embodiment of a regulated current source used in the circuit charge pump arrangement.

FIG. 6 illustrates a current source CS as shown in the embodiment of FIG. 1, including a load connected thereto. The current source comprises three regulation loops Loop1, Loop2 and Loop3. Loop3 also includes the power source and will be explained later in detail. Current source Cs comprises an adjustment device Mp, which in this case is implemented as field-effect transistor. Device Mp may comprise one or more field-effect transistors arranged in parallel, transmission gates of other devices suitable for the purpose of implementing a variable resistance.

Adjustment device Mp is coupled to an output terminal of power source CP and provides an output voltage and current to an externally applied load 20. The gate of adjustment device and transistor Mp receives control voltage Vg which is provided by first loop Loop1. First loop Loop1 comprises a first sensing path, a comparator or amplifier A1 and a first reference current source Ir1. The first sensing path includes first current sensing transistor Ms1 connected in series to second transistor M5. A drain terminal of second transistor M5 is coupled to an inverting input of comparator A1. The non-inverting input of comparator A1 receives a reference current from reference source Ir1. The output of comparator A1 provides voltage control signal Vg to the gate of current sensing transistor Ms1 in the first sensing path and to the gate of adjustment device Mp. Sensing transistor Ms1 is used to sense the current through adjustment device Mp. As a result, the output current Ip is maintained constant with regulation of Loop1.

Second loop Loop2 is implemented using transistor M5 of the first current sensing path and a second comparator or amplifier A2. While the output of second comparator A2 is connected to the gate of transistor M5, the inverting input receives a voltage signal Vd1 derived by the resistance of the transistors M5 and Ms1. So, the inverting input of second comparator A2 is connected to a node between transistors Ms1 and M5, respectively. The non-inverting input of comparator A2 is connected to the output terminal to receive the output voltage Vled. Loop2 regulates voltage Vd1 of the first current sensing path to the output voltage Vled.

The loss of power across the adjustment device and the adjustment transistor is dependent on Vcurr, the voltage drop across adjustment device Mp. This voltage is multiplied by current Ip drawn by load 20 through adjustment device Mp. Hence, $P_{loss}$=Vcurr*Ip. Accordingly, the power loss $P_{loss}$ may increase with the voltage drop across the adjustment device.

To reduce the power loss and thereby enhance efficiency, a third loop Loop3 is provided comprising a second current sensing path including second current sensing transistor Ms2 and second transistor M8 connected in series. The drain terminal of second transistor M8 provides an output current Ifb which is applied to comparator device A4 to generate digital regulation signal VREG based on a comparison of Ifb with a reference current provided by Ir2.

In addition, second loop loop2 comprises a voltage generation device 15 arranged between the gate terminals of transistor M5 of the first sensing path and transistor M8 of the second sensing path. The voltage generation device may also be arranged between the drain terminal of Ms2 and source terminal of M8. Voltage generation device 15 is illustrated as a voltage source and provides a delta voltage V5, thereby restricting second sensing transistor Ms2 to operate in a linear region of its I-V characteristics. The operation of current sensing transistor Ms2 of the second sensing path in its linear region results in regulation of output current Ifb of the second sensing path to a reference value. A proper selection of delta voltage Vδ provided by voltage generation device 15 causes current sensing transistor Ms1 of the first sensing path to operate in saturation of its characteristics at the same time. With transistor Ms2 operating in its linear region, the current Ifb is linearly changing with the output voltage Vgen provided by the power source. As a result, the voltage Vgen applied to adjustment device Mp is adjusted such that adjustment device is still operating, but the voltage drop Vcurr is as small as possible thereby reducing power loss.

Figure 6A:
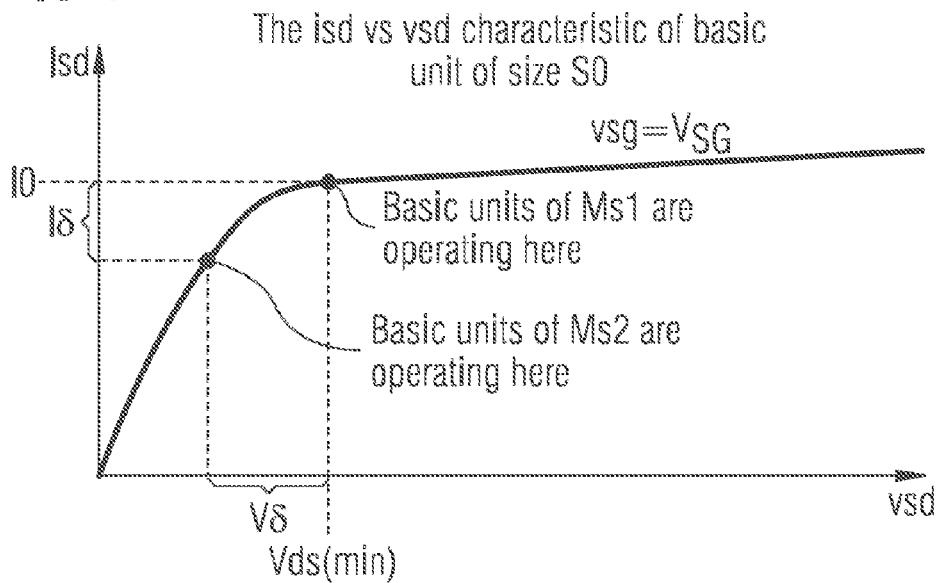
FIG. 6A shows a Source-Drain diagram illustrating the operation principle of a regulated current source.

The operation of transistors Ms1 and Ms2, which preferably comprise the same source gate voltage are illustrated in FIG. 6A.

The figure shows the IV-Source-Drain diagram of transistors Ms1 and Ms2 based on (or related to) a pre-specified size S0. As illustrated, transistor Ms1 of the first sensing path is operating in its saturated region given by a minimum voltage drop Vds across Drain-Source where it can operate normally. In contrast thereto, transistor Ms2 is operating in its linear region. It should be noted that the basic units with size S0 are shown herein. The difference between both operation points is given by Vδ and Iδ, wherein Vδ is caused by the voltage generation device 15.

In steady state, the (basic) output current Ifb of the second sensing path is given by the difference of $N_{Ms2}*(I0-I\delta)$, wherein I0 is a basic unit current in steady state.

The second sensing transistor Ms2 is matched with the first sensing transistor Ms1, particularly with respect to their source-gate voltage $V_{SG}$ as indicated in FIG. 6A. However, their size ratio may differ with a fixed and particularly integer value. For instance, the size ratio is $N_{Ms2}/N_{Ms1}$ wherein N is a respective integer. Even with the size ratio as given, the steady state currents in sensing transistors Ms2 and Ms1 do not have the same ratio. In fact, the current in the second sensing transistor Ms2 is regulated to a somewhat lower value. Accordingly, $I_{ms2}$ is smaller than $N_{Ms2}/N_{Ms1}*I_{Ms1}$. Hence, transistor Ms2 is actually operating in a linear region of its characteristics as illustrated in FIG. 6A.

The operation of transistor Ms2 of the second sensing path is achieved by the equation $$Vds=Vlin+V\delta,$$

wherein Vδ is a predetermined reference voltage given by the voltage generation device 15 and Vds is the source-drain voltage across Ms2. As a result, the drain voltage of first sensing transistor Ms1 is Vδ volts smaller than the drain voltage Vd2 of transistor Ms2 of the second sensing transistor. With the proper choice of V5, which is explained later in greater detail, it is possible that transistor Ms1 is operating in saturation and it can regulate current Is1 to the reference current of the first reference source Ir1 in the first loop with comparator A1.

Accordingly, if second loop Loop2 can achieve regulation, then Loop1 regulation is guaranteed. The voltage drop Vcurr across the adjustment device and adjustment transistor Mp is by Vδ higher than the voltage drop across second sensing transistor Ms2. With minimum selection of Vδ given by the voltage generation device 15, which can maintain regulation of Loop1, the voltage drop across the adjustment device Mp can be maintained to lowest value. The output voltage of the power source CP will be set automatically so that all loops are stable.

Figure 7:
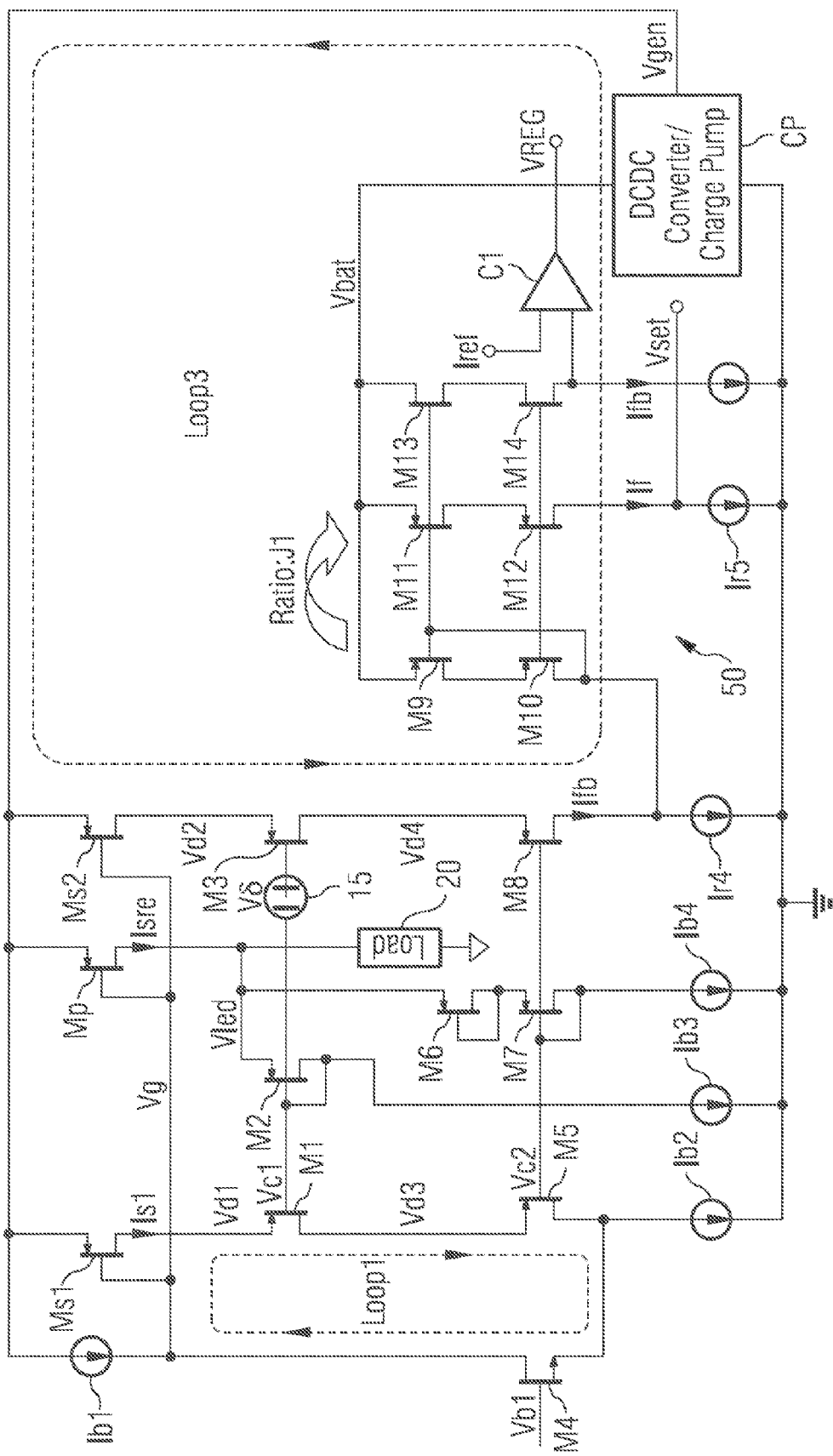
FIG. 7 shows another embodiment of a regulated current source used in the charge pump arrangement.

FIG. 7 illustrates a further embodiment of a current source including the loop using the second sensing path of the current source and the power source CP for generating the output voltage Vgen.

The current source according to FIG. 7 comprises a power source CP generating an output voltage signal Vgen. Power source CP may include a charge pump, a DC/DC converter or any other source which is capable of generating and maintaining different output voltages.

Output voltage signal Vgen supplies first bias current source Ib1 and is also applied to the first sensing path, adjustment transistor Mp and transistor Ms2 of the second sensing path. Adjustment transistor Mp is connected with its drain terminal to the output terminal of the current source at which load 20 is connected to. Output voltage Vled is derived by the resistance of load 20. The output terminal is also coupled with comparator A2 as illustrated in FIG. 6, said comparator implemented by transistors M2, M6 and M7 as well as bias current sources Ib2 and Ib3.

Particularly, the output terminal of the current source is coupled to source terminals of transistors M2 and M6. Transistor M6 is coupled with its gate to the drain terminal, thereby forming a diode. Drain terminal of transistor M6 is also coupled to source terminal of transistor M7. The gate of transistor M7 is connected to its drain terminal and coupled to a bias current source Ib4. The respective output voltage VC2 is applied to transistor M8 of the first sensing path as well as to transistor M5 of the second sensing path.

The output terminal of the current source is also connected to transistor M2, the gate of transistor M2 coupled to its drain terminal. The gate terminal is also connected to voltage generation device 15 and to the gate of transistor M1, said transistor M1 connected in series to transistor M5 and Ms1 of the first sensing path. The other terminal of the voltage generation device 15 is connected to transistor M3, arranged between transistors M8 and Ms2 of the second sensing path.

Finally, Loop1 comprises transistor M4 connected to drain terminal of transistor M5 as well as the bias current source Ib2. The source of transistor M4 represents the output for providing the gate voltage Vg to sensing transistors Ms1, adjustment transistor Mp and sensing transistor Ms2. The gate of transistor M4 receives a first bias voltage Vb1.

In operation of the current source according to the embodiment of FIG. 7, transistor Ms2 is restricted to operated in a linear region due to voltage generation device 15. Output current Ifb of the second sensing path is mirrored in current mirror 50, said current mirror having current mirror ratio J1. The current mirror is supplied by external supply voltage Vbat, which is also applied to power source CP. Current mirror 50 comprises a first current mirror transistor M10 connected in series to a second current mirror transistor M9. A first terminal of current mirror transistor M10 is connected to a node between a reference current source Ir4 and drain terminal of transistor M8, said transistor being part of the second sensing path. Current mirror transistors M9 and M10 mirror the current to transistors M11 and M12 to provide an output current If, which is not used in this embodiment. further mirror transistors M13 and M14 and reference current source Ir5 provide output signal $I_{fb}$. The signal is compared with a reference signal $I_{ref}$ to obtain the digital regulation signal VREG.

In the embodiment, voltage Vd1 between transistor M1 and sensing transistor Ms1 of the first sensing path is equalized to the output voltage Vled using transistors M1, M2, M5, M6 and M7 together with bias current sources Ib1, Ib2, Ib3 and Ib4. The first loop Loop1 regulates the current Is1 to the difference of bias source current Ib2-Ib1. Second sensing path including transistors Ms2, M3 and M8 is used to regulate output voltage Vgen. If the current through sensing transistor Ms2 increases, the output voltage will increase resulting in a decrease of signal $I_{fb}$. If $I_{fb}$ fall below a certain threshold, comparator C1 will switch the value of VREG to low value indicating that the current source cannot uphold its regulation and is therefore not regulated any more.

Figure 8:
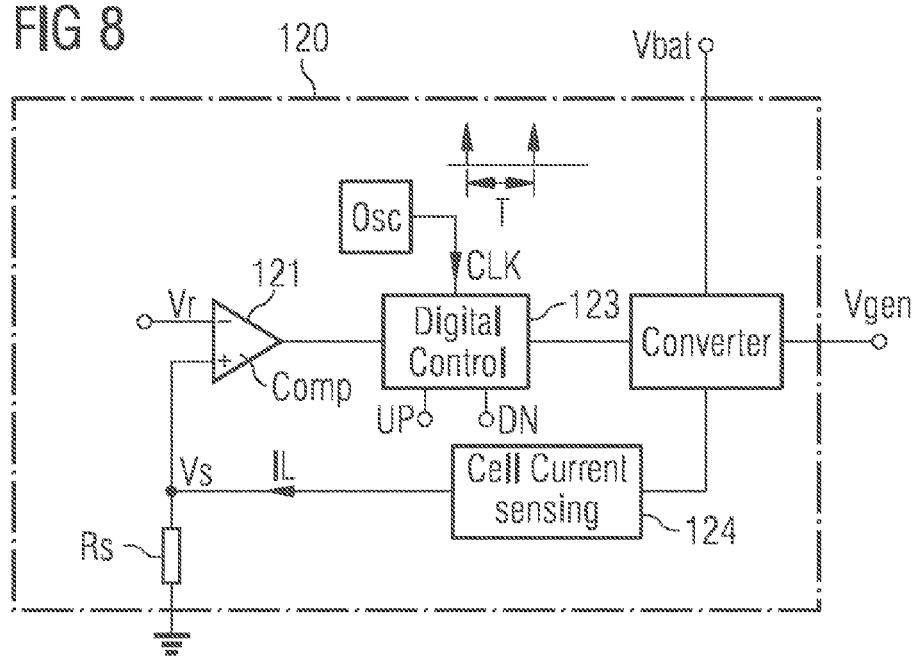
FIG. 8 illustrates a schematic view of a DC/DC converter usable in the circuit charge pump arrangement.

FIG. 8 is another embodiment of a power supply using a DC/DC converter or a charge pump. The power supply is operated with a clock signal CLK provided by an oscillator OSC. Clock signal CLK is applied to a digital control unit 123 which also receives up and down signals UP, DN by the control logic. Using control signals UP, DN, digital control block 123 causes the respective switching signals to operate the converter with corresponding multiplication factor. Switching signals for switches in the converter are generated using clock signal CLK by digital control block 123 and applied to the converter. The converter can be implemented using a DC/DC converter or a charge pump. In any case, the converter uses the externally applied supply voltage Vbat to provide the output voltage Vgen, wherein the maximum value of the output voltage Vgen is depending on the switching signals provided by the digital control block 123 corresponding to a respective multiplication factor. The converter further provides an output signal which is applied to a coil current sensing unit 124 in a feedback path. Current sensing unit 124 provides a sensing current to a voltage/current converter comprising resistor RS. The respective generated voltage Vs corresponds to the output current provided by the coil current sensing unit 124. Voltage Vs is applied to comparator 123 together with a reference voltage Vr to drive the converter in a stable manner.

Current sources CS0 to CS2 of the embodiment of FIG. 1 provide respective regulation signals VREG0 to VREG2 indicating whether they operate regulated or not. Still, the regulation signals do not provide information, whether the current sources may also be able to operate at even lower supply voltage Vgen and still provide a positive indication signal. In other words, even if all indication signals VREG0 to VREG2 indicate that the respective current sources operate regulated, one may assume that a slightly smaller output voltage is still able to supply the current sources connected thereto to operate in regulated mode. It may therefore be possible to decrease the output voltage of the power supply without loss of regulation of the respective current sources connected thereto.

For this purpose, FIGS. 9A to 12 illustrate several embodiments and devices to determine whether the output voltage of the power supply can be decreased without the loss of regulation of any of the current sources.

Figure 9A:
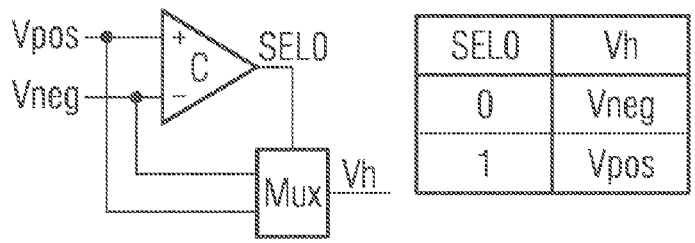
FIG. 9A-9C illustrate the decoding logic for providing the load signal applied to the dummy current source.
Figure 9B:
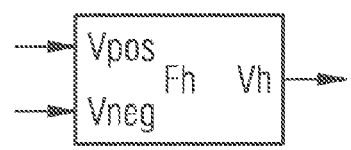
Figure 9C:
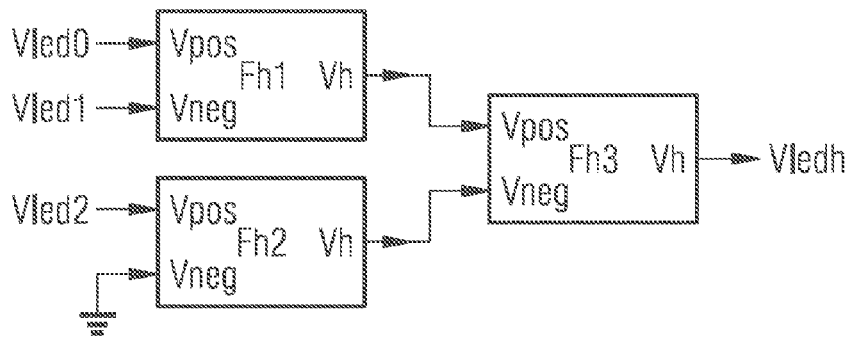

FIGS. 9A to 9C Illustrate the determination of the highest voltage, which is required by one of the loads connected to the current sources. The higher the voltage across one of the loads connected to the current source the higher the supply signal Vgen provided by the power source must be. As a result, the highest voltage drop across the loads and or highest current drawn by the load limits the voltage of the power supply with respect to it lowest value.

For this purpose, several comparators are required. Each comparator receives a signal at its respective inverting and non-inverting input and provides selection signal SEL0 to a multiplexer unit MUX. In response to the selection signal SEL0, the multiplexer unit MUX provides the higher of both voltages of its output terminal as illustrated in FIG. 9A.

To determine the highest voltage of several multiple voltages, three of such comparator devices Fh are implemented as shown in FIG. 9C. In the embodiment, the first comparator device Fh1 receives the output voltages Vled0 and Vled1 of the respective current sources CS0 and CS1. These output voltages are given by the current provided by the current sources and the load connected to the output terminals of the respective current source.

The comparator device Fh1 provides the higher voltage of both voltages to another comparator device Fh3. In addition, a second comparator device Fh2 receives third output voltage Vled2 of the third current source CS2 at its non-inverting input or as a positive signal. The inverting or negative voltage terminal of comparator device Fh2 is connected to ground. Accordingly, the higher of both voltages is applied at the inverting input or as a negative voltage to the third comparator device Fh3. In summary, the third comparator device provides the highest output voltage Vledh of the three output voltages Vied0 to Vled2 of the respective current source. This output voltage is now used to determine whether a smaller output voltage Vgen of the power source CP can be used to operate the respective current sources CS in regulated mode.

For this purpose, a dummy power source as well as a dummy current source CSdn is provided. The dummy power source may be similar to the power source used to drive current sources CS0 to CS2. Accordingly, dummy current source CSdn may comprise a similar structure as current sources CS0, CS1 and CS2.

Figure 10:
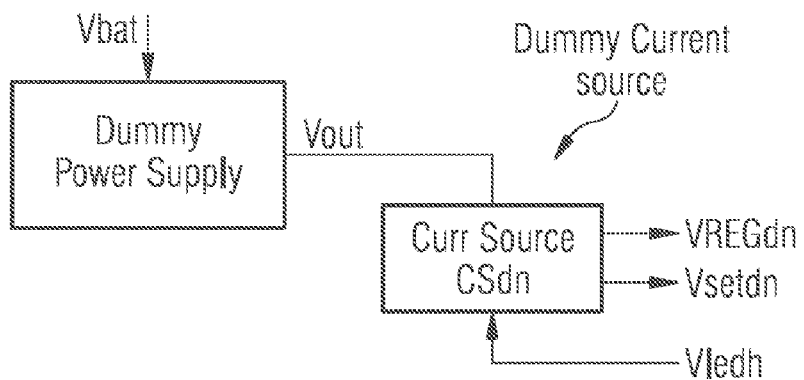
FIG. 10 illustrates an embodiment of the dummy charge pump and the dummy current source.

FIG. 10 shows a respective embodiment in which a dummy power source provides output voltage Vout to a respective dummy current source CSdn. Dummy current source CSdn will determine, whether it can provide enough output current to operate regulated, if a load corresponding to signal Vledh is connected thereto. If operation in regulated mode is possible, dummy current source CSdn may provide second indication signal VREGdn indicating that regulated operation is possible even with the smaller output voltage provided by the dummy charge pump. As a result, the control circuit receiving second indication signal VREGdn may generate a respective control signal causing the power supply to decrease the output voltage, by for example switching down to the next lower multiplication factor.

The output voltage Vout provided by the dummy power supply or the dummy charge pump is lower than the respective output voltage Vgen provided by the power supply to current sources CS0 to CS2. A lower output voltage Vout of the dummy power supply can be achieved, for instance as indicated in FIG. 10, by using a multiplication factor, which is at least one value lower than the respective multiplication factor used in the controlled and clocked power supply. For this purpose, the dummy power supply may comprise the same or similar structure as power supply CP. If the multiplication factor of the power supply is N, causing the power supply to generate the output voltage Vgen, the multiplication factor of the dummy power supply can be N−1 resulting in a smaller output voltage Vout.

Figure 11:
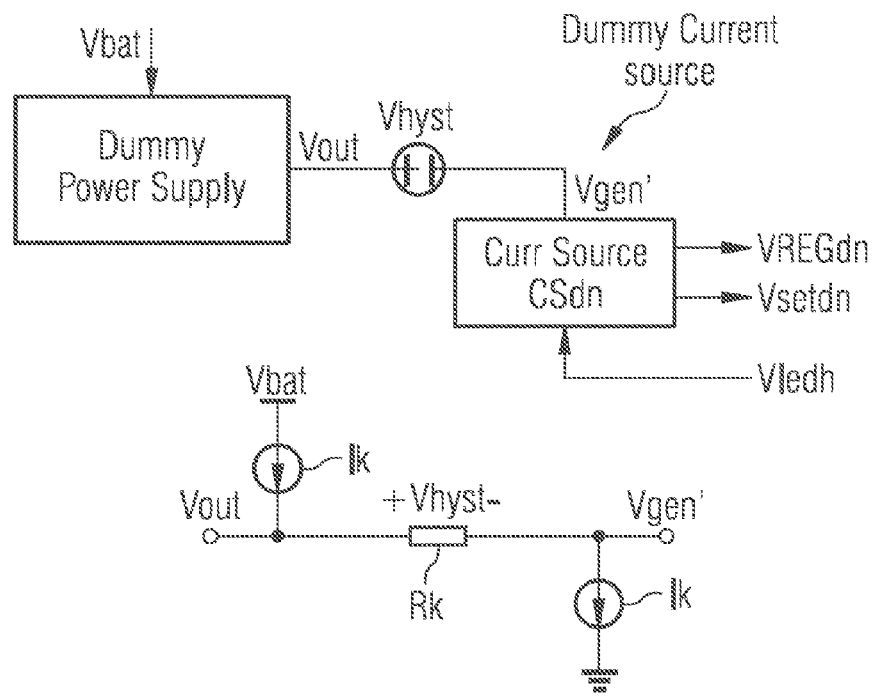
FIG. 11 illustrates another embodiment of the dummy charge pump and the dummy current source, including a regulating element.

An alternative embodiment is illustrated in FIG. 11. In this embodiment, an additional resistive element is arranged between the output terminal of the dummy power supply and dummy current source CSdn to introduce an extra voltage drop. This allows also providing a hysteresis effect to prevent up and down switching between two different values of the multiplication factor. The additional hysteresis element Vhyst is presented in the lower portion of FIG. 11 and comprises a variable resistor Rk. One terminal of the variable resistor is coupled to the output terminal of the dummy power source and to current source Ik, which is connected to the external supply voltage Vbat. A second current source Ik is arranged between the terminal for providing the voltage Vgen to the dummy current source CSdn and the second terminal of variable resistor Rk. The hysteresis effect can be implemented using the resistor Rk and the current source arrangement with two current sources Ik as shown in FIG. 11. Because of the output voltage Vgen' being lower than voltage signal Vout provided by the dummy power source, dummy current source CSdn will not be operated in regulated mode and therefore not provide the respective second indication signal VREGdn until voltage Vgen' is sufficiently high enough. In turn, voltage Vgen' will be higher when the externally applied voltage Vbat increases. This means that second indication signal VREGdn will not become high, thereby indicating that the dummy current source CSdn is in regulated mode unless the externally applied voltage Vbat is sufficiently higher. With different values of resistor Rk, the threshold for the externally applied voltage Vbat to initiate the down-switching process by providing second indication signal VREGdn will become higher or lower. On the contrary, the first indication signal causing the control circuit to increase the output voltage Vgen and the multiplication factor of the power source, respectively will immediately be provided as soon as one of the current sources becomes unregulated.

Figures 12, 13:
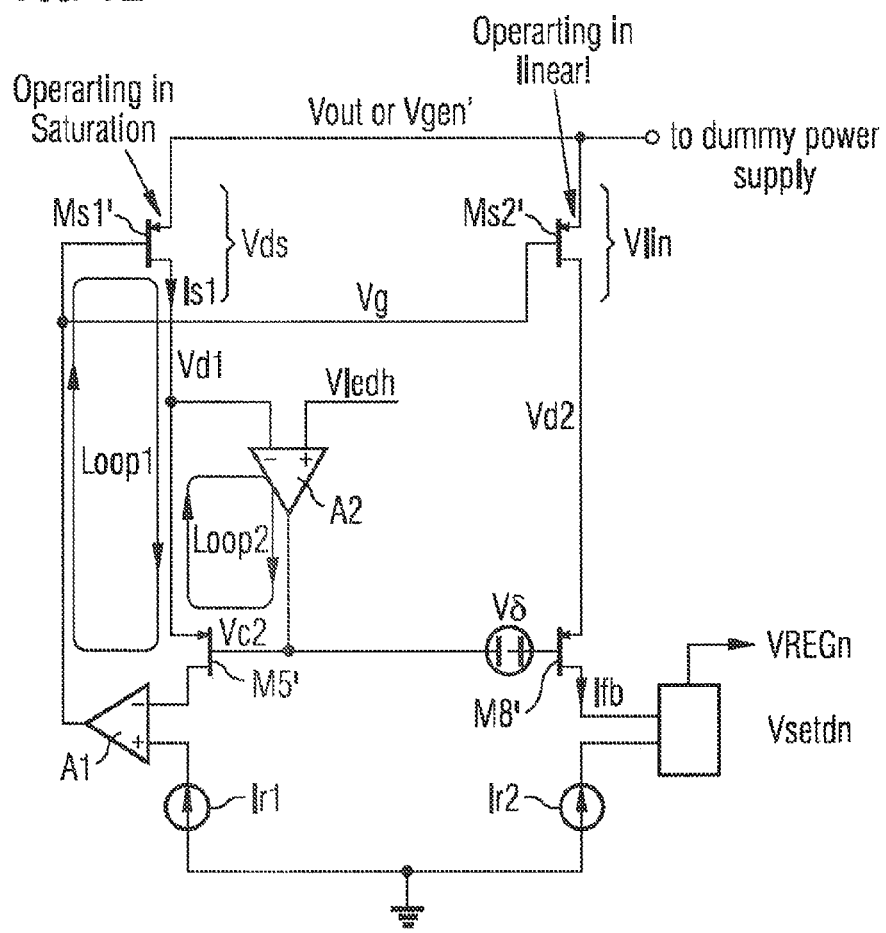
FIG. 12 illustrates an embodiment of the dummy current source.
FIG. 13 shows a prior art circuit charge pump arrangement using multiplication factors to adjust the output voltage.
Figure 14:
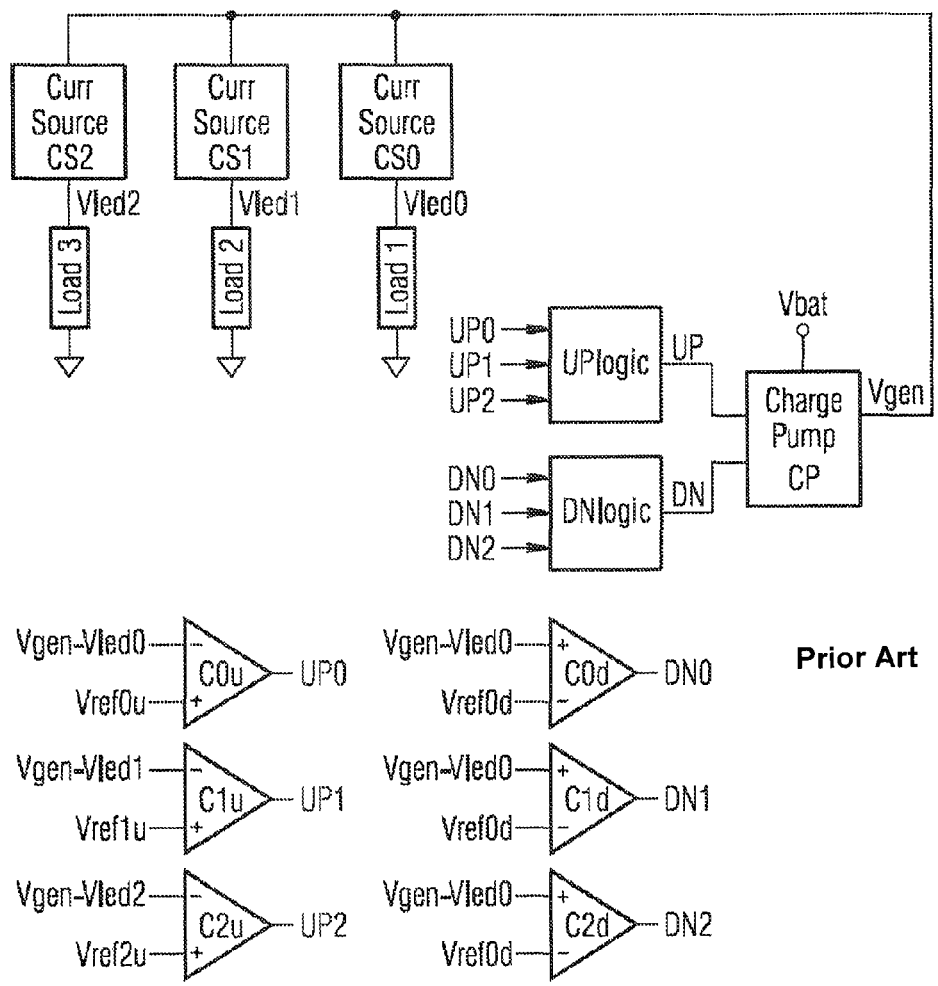
FIG. 14 shows a prior art circuit charge pump arrangement.

FIG. 12 shows an embodiment of a dummy current source CSdn which comprises a similar structure with respect to the current source as shown in FIG. 6. In this respect, a similar structure means that the circuit layout is similar. However, the sensing transistors Ms1', Ms2' of the first and the second sensing path may be scaled down with respect to the corresponding sensing transistors in the current source as shown in FIG. 6. Also, transistors M5' and M8' may be scaled down. In any case, providing dummy current source CSdn having a similar structure as to the current sources used to provide the load current to the respective loads may also reduce external parameters like, for instance, temperature effects because those parameters affect the current sources as well as the dummy current source equally.

As indicated in FIG. 12, the load signal Vledh is applied to comparator A2 of the second loop Loop2. Still, the adjustment device Mp as shown in FIG. 6 is missing because it is not needed.

The power source arrangement according to embodiments of the present invention therefore uses digital switching to provide different output voltages to one or more current sources. Each of the current sources provides a respective current to a load connected thereto. Depending on the supply signal applied to the current sources, one or more of the current sources may operate unregulated meaning that the power supply does not provide sufficiently high supply signals to the respective current source. In response to such unregulated operation, the current source provides an indication signal indicating that it is in unregulated operation. These indication signals VREG1 to VREGN are applied to a control circuit. In response to the first indication signals provided by the respective current sources, the control circuit may generate control signals to increase the output voltage of the power supply.

In addition, voltage drops across loads connected to the respective current sources or current drawn by those loads are determined and processed. A dummy power source and a dummy current source connected thereto receive the processed signal and provide a second indication signal. Said second indication signal indicates whether the dummy current source operates regulated. If regulated operation is the case for the dummy source even if the supply voltage provided by the dummy power source is significantly lower than the respective supply voltage provided by the power source, the dummy current source will issue a second indication signal to the control circuit. Upon reception of the second indication signal, the control circuit may generate a control signal to decrease the output voltage of the power supply. Increase or decrease of the output voltage of the power supply can be achieved by switching to a higher or lower multiplication factor, respectively.

As the power source structure and the dummy power source structure as well as the current source structure and the dummy current source structure can be substantially equal, temperature and external parameter effects are automatically adjusted.

The invention claimed is:
1. A circuit pump arrangement, comprising:
   a controlled power source, said controlled power source providing an output voltage out of a plurality of discrete output voltages in response to a control signal;
   one or more regulated current sources, each being connected to the controlled power source to provide an output current to respective loads, each of the one or more regulated current sources adapted to provide a first indication signal indicating its regulation state;
   a dummy power source adapted to provide an output voltage being smaller than the output voltage of the controlled power source;
   a dummy current source connected to the dummy power source and adapted to receive a load signal corresponding to the highest voltage drop over the loads connected to the one or more regulated current sources and to provide a second indication signal in response thereto indicating its regulating state; and
   a control circuit adapted to receive the respective first indication signal and the second indication signal and to provide the control signal in response thereto.

2. The circuit pump arrangement of claim 1, wherein the dummy power source is adapted to provide a plurality of discrete output voltages in response to a signal derived by the control signal.

3. The circuit pump arrangement claim 2, wherein a first multiplication factor is assigned to the control signal and a second multiplication factor is assigned to the signal and wherein the respective discrete output voltage is given by the respective multiplication factor times a supply voltage applied to at least one of the controlled power source and the dummy power source.

4. The circuit pump arrangement of claim 3, wherein the second multiplication factor comprises a lower value than the first multiplication factor.

5. The circuit pump arrangement of claim 1, 4, wherein the controlled power source is adapted to increase or decrease its output voltage to the next discrete higher or lower voltage value in response to the control signal.

6. The circuit pump arrangement of claim 1, wherein the dummy power source comprises a regulating element to provide an output voltage to the dummy current source, which is lower than the output voltage provided by the controlled power source.

7. The circuit pump arrangement of claim 1, wherein the controlled power source and/or the dummy power source comprise one of the following:
 a controlled and clocked operated charge pump; and
 a controlled DC/DC converter.

8. The circuit pump arrangement of claim 1, wherein the one or more regulated current sources and/or dummy current source comprise:
 a terminal adapted to receive a sensing voltage said sensing voltage provided by the load or the load signal;
 a first loop comprising a first sensing path having a sensing transistor; and
 a second loop, the second loop comprising a second sensing path with a sensing transistor and the controlled power source;
 wherein the first and second sensing paths are coupled to the output terminal of the controlled power source;
 wherein the first loop is adapted to provide a control signal at least to the sensing transistor of the second sensing path;
 and wherein the second sensing path is coupled to the first sensing path so as to restrict the sensing transistor of the second sensing path to operate in a linear region of its characteristic.

9. The circuit pump arrangement according to claim 8, wherein the second sensing path provides a sensing signal dependent on a current derived by the difference of source-drain voltages of the sensing transistors of the first and second sensing path in operation.

10. The circuit pump arrangement according to claim 9, wherein the first indication signal is generated in response to a comparison of the sensing signal with a reference signal.

11. The circuit pump arrangement according to claim 8, wherein the one or more regulated current sources further comprise:
 a controllable output device connected to the output terminal of the controlled power source and to the terminal to provide the output current to respective loads, wherein the first loop is adapted to provide the control signal to the controllable output device.

12. The circuit pump arrangement according to claim 8, wherein the sensing transistors of the one or more regulated current sources and the dummy current source have a predetermined size ratio.

13. The circuit pump arrangement according to claim 1, further comprising:
 a comparison unit for generating the load signal in response to one or more signals, each signal corresponding to a voltage drop across one of the respective loads connected to the one or more regulated current sources or to a current drawn by the respective loads.

14. A method for adjusting an output voltage in a current source arrangement, comprising one or more current sources, each of the current sources being supplied by a common power source, the power source being adapted to provided a supply voltage to the current sources out of a digitally selectable output voltages, the method comprising:
 providing a first supply voltage to the one or more current sources;
 providing a supply current to loads connected to the one or more current sources;
 generating a load signal indicating the highest current drawn by the respective load;
 generating a first indication signal, if the one or more current sources is not capable of providing sufficient current to the load;
 generating a second indication signal in response to the load signal, if the one or more current sources may be capable of providing sufficient current to the load when being supplied with less supply voltage; and
 changing the first supply voltage in response to the first and second indication signals.

15. The method of claim 14, wherein generating a second indication signal comprises:
 generating a second supply voltage, the second supply voltage being smaller than the first supply voltage;
 determining, whether the one or more current sources may operate in regulated mode using the load signal when being supplied by the second supply voltage; and
 generating the second indication signal in response thereto.

* * * * *